(12) United States Patent
Gao et al.

(10) Patent No.: US 7,925,646 B2
(45) Date of Patent: *Apr. 12, 2011

(54) ESTIMATING THE COMPILATION TIME OF A QUERY OPTIMIZER

(75) Inventors: Dengfeng Gao, Tucson, AZ (US); Ihab F. Ilyas, West Lafayette, IN (US); Eileen Tien Lin, San Jose, CA (US); Guy Maring Lohman, San Jose, CA (US); Jun Rao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/032,838

(22) Filed: Feb. 18, 2008

(65) Prior Publication Data

US 2008/0154844 A1 Jun. 26, 2008

Related U.S. Application Data

(63) Continuation of application No. 10/673,433, filed on Sep. 30, 2003, now Pat. No. 7,356,526.

(51) Int. Cl.
*G06F 7/00* (2006.01)
*G06F 17/30* (2006.01)
(52) U.S. Cl. .................. 707/714; 707/718; 707/719
(58) Field of Classification Search .............. 707/2, 4, 707/203, 8, 713, 714, 715, 716, 717, 718, 707/719
See application file for complete search history.

(56) References Cited

U.S. PATENT DOCUMENTS

| 5,301,317 | A | * | 4/1994 | Lohman et al. | 1/1 |
|---|---|---|---|---|---|
| 5,619,692 | A | * | 4/1997 | Malkemus et al. | 1/1 |
| 5,761,653 | A | * | 6/1998 | Schiefer et al. | 707/713 |
| 5,761,657 | A | * | 6/1998 | Hoang | 1/1 |
| 5,987,455 | A | * | 11/1999 | Cochrane et al. | 1/1 |
| 6,092,062 | A | * | 7/2000 | Lohman et al. | 1/1 |
| 6,397,204 | B1 | * | 5/2002 | Liu et al. | 1/1 |
| 6,847,978 | B2 | * | 1/2005 | Ellis et al. | 707/713 |
| 2002/0198867 | A1 | * | 12/2002 | Lohman et al. | 707/3 |
| 2003/0212664 | A1 | * | 11/2003 | Breining et al. | 707/3 |

OTHER PUBLICATIONS

Chu et al. (Non-Patent Literature: "Least Expected Cost Query Optimization, An exercise in Utility", ACM 1999, Philadelphia.*
"Least Expected Cost Query Optimization: An Exercise in Utility"; Francis Chu, Joseph Y. Halpern, Praveen Seshadri; ACM 1999, Philadelphia.*
Chu et al. "Least Expected Cost Query Optimization, an exercise in Utility," ACM 1999, Philadelphia.
"Heuristic Method for Joining Relational Data Base Tables," IBM Technical Disclosure Bulletin, Feb. 1988, pp. 8-11.

(Continued)

*Primary Examiner* — Giovanna Colan
(74) *Attorney, Agent, or Firm* — IP Authority, LLC; Ramraj Soundararajan

(57) ABSTRACT

A compilation time estimator provides a quantified estimate of the optimizer compilation time for a given query optimizer. The estimator automates the optimizer to choose the right level of optimization in commercial database systems. The estimator reuses an optimizer's join enumerator to obtain actual number of joins, but bypasses plan generation to save estimation overhead, and maintains a small number of interesting physical properties to estimate the number of plans by using a linear regression model. The estimator uses the number of generated plans to estimate query compilation time.

20 Claims, 9 Drawing Sheets

OTHER PUBLICATIONS

Polyzotis et al., "Statistical Synopses for Graph-Structured XML Databases," ACM SIGMOD, Jun. 4-6, 2002, Madison, Wisconsin, pp. 358-369.

Antoshenkov et al., "Query Processing and Optimization in Oracle Rdb," VLDB Journal, 1996, pp. 229-237.

Blohsfeld et al., "A Comparison of Selectivity Estimators for Range Queries on Metric Attributes," ACM SIGMOD, 1999, Philadelphia, PA, pp. 239-250.

Choi et al., "Selectivity Estimation for Spatio-Temporal Queries to Moving Objects," ACM SIGMOD, Jun. 4-6, 2002, Madison, WI, pp. 440-451.

Swami, "Optimization of Large Join Queries: Combining Heuristics and Combinational Techniques," ACM SIGMOD 1989, pp. 367-376.

Ioannidis et al., "Randomized Algorithms for Optimizing Large Join Queries," ACM SIGMOD 1990, pp. 312-321.

"Adaptive Access Plan for Select Queries with Multiple Predicates," IBM Technical Disclosure Bulletin, V32 N8B, Jan. 1990, pp. 6-10.

"Integrated Buffer Management and Query Optimization Strategy for Relational Databases," IBM Technical Disclosure Bulletin, V32 N12, May 1990, pp. 253-257.

Ilyas et al., "Estimating Compilation Time of a Query Optimizer," ACM SIGMOD, Jun. 9-12, 2003, San Diego, CA, 12pgs.

* cited by examiner

Both Queries Have 4 Joins (A,B)   (B,C)   (A,BC)   (AB,C)

```
Select A.2              Select A.2
From A,B,C              From A,B,C
Where A.1 = B.1         Where A.1 = B.1
  and B.2 = C.2  ;        and B.2 = C.2
                        Order By A.2  ;
```

MEMO Structure

Number of Plans = 12

MEMO Structure

Number of Plans = 15

```
initialize(S)
input S: a MEMO entry
begin
  Allocate an interesting property list for S.
  If (S is for a single table)
    populate interesting property list for S based on
      the generation policy of P
end accumulate_plans(S, L, J)
input S,L: MEMO entries of two table sets to be joined
output J: MEMO entry of the joined table sets
begin
  define $list_s$, $list_l$ and $list_j$ to be the interesting
    property list of S, L and J respectively
  For each property p in $list_s$ and $list_l$
    if (p can be propagated by at least one join method)
      if (p has not been retired by the join AND
        p is not equivalent to any property in $list_j$)
        add p to $list_j$
  For each join type t
    accumulate join plans in $join_t$
    if (t fully propagates P)
      $join_t$+ = $|list_s \cup list_l|$
      $join_t$+ = 1 (for DC property)
    if (t partially propagates P)
      $list_p$ = $\{p|p \in list_s \cup list_l, t$ propagates $p\}$
      $list_c$ = $\{p2|p1 \prec p2, p1 \in list_p, p2 \in list_s \cup list_l\}$
      ($list_c$ is the coverage list)
      $join_t$+ = $|list_p \cup list_c|$
    if (t doesn't propagates P)
      $join_t$+ = 1
end
```

FIG. 4

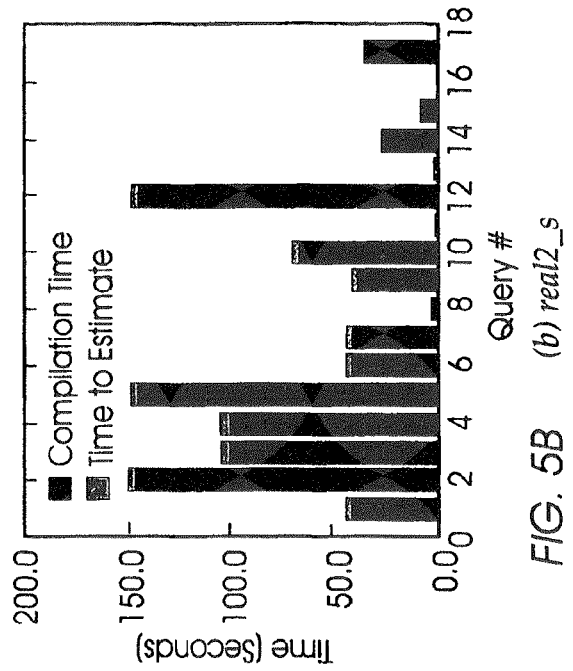
FIG. 5A (a) linear_s
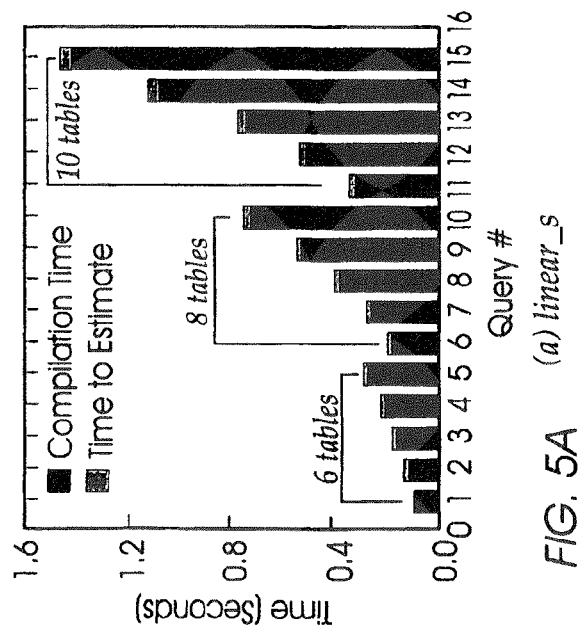
FIG. 5B (b) real2_s
| Actual Time | Time to Estimate | Pctg |
|---|---|---|
| 17.010 | 0.115 | 0.7% |
| 1.103 | 0.031 | 2.8% |
| 4.353 | 0.022 | 0.5% |
| 12.670 | 0.085 | 0.7% |
| 1.771 | 0.0203 | 1.1% |
| 11.161 | 0.038 | 0.3% |
| 11.157 | 0.035 | 0.3% |
| 1.350 | 0.0173 | 1.3% |
(c) real1_p
FIG. 5C

FIG. 6D
FIG. 6E
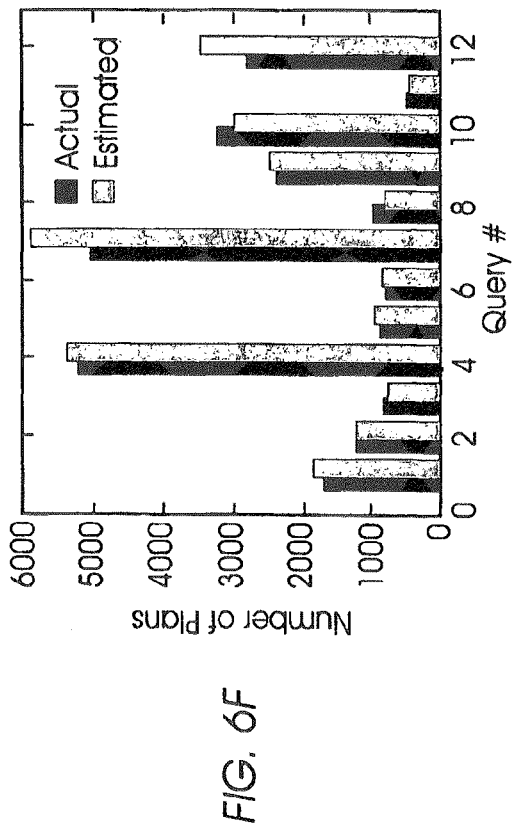
FIG. 6F

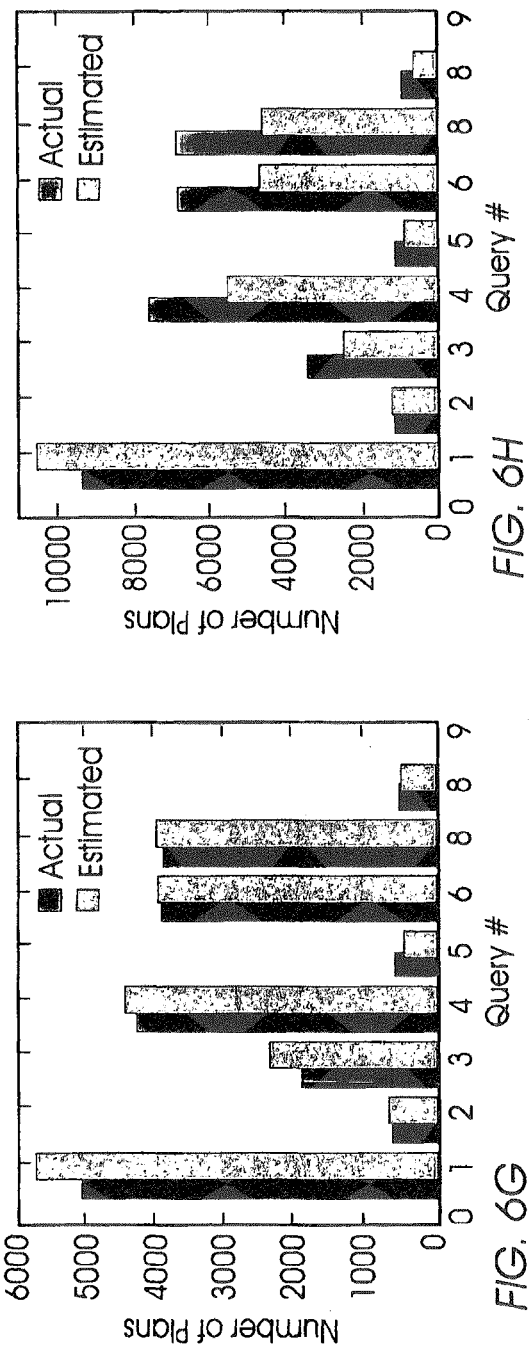
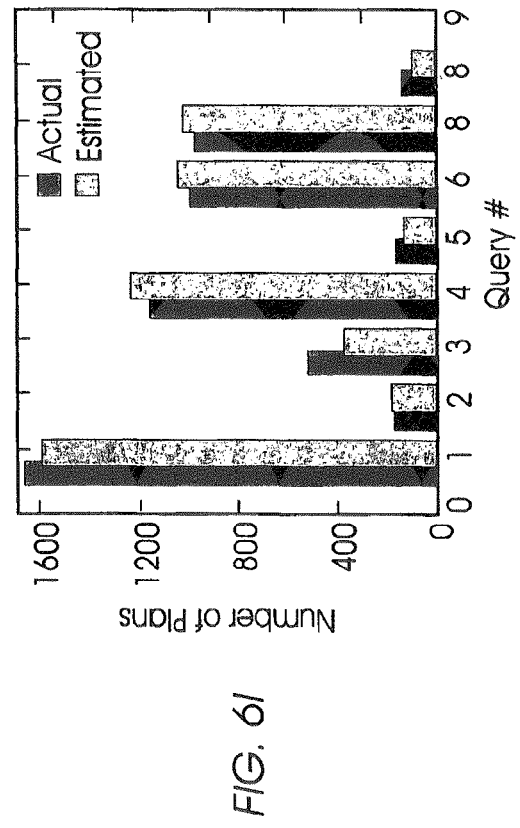
FIG. 6H
FIG. 6G
FIG. 6I

ESTIMATING THE COMPILATION TIME OF A QUERY OPTIMIZER

This application is a continuation of U.S. application Ser. No. 10/673,433, filed Sep. 30, 2003, pending.

BACKGROUND OF THE INVENTION

1. Field of Invention

The present invention relates generally to optimizing queries in database systems. More specifically, the present invention is related to the estimating compilation time of a query optimizer.

2. Discussion of Prior Art

A query optimizer in a database system translates a non-procedural query into a procedural plan for execution, typically by generating many alternative plans, estimating the execution cost of each, and choosing the plan having the lowest estimated cost. The complexity of an optimizer is mainly determined by a search space and an enumeration algorithm enumerating plans in the search space. In general, increasing the search space of an optimizer improves the chances, but does not guarantee that it will find a better plan. Further, increasing the search space increases the cost (compilation time) for optimizing the query.

A major challenge in the design of a query optimizer is to ensure that the set of feasible plans in the search space contains efficient plans without making the set too big to be generated practically. For that purpose, most commercial database systems often have multiple levels of optimization. For example, as described in the paper by Selinger et al. entitled "Access Path Election in a Relational Database Management System," a system can have a "low" level of optimization that employs a polynomial-time greedy method or a randomized algorithm, and a "high" level that searches all bushy plans using a conventional dynamic programming enumeration method. "Knobs" within an optimizer (such as limits on the composite inner size and whether Cartesian products are allowed or not) essentially create many additional "intermediate" optimization levels. The higher the optimization level, the better the chance of getting a good execution plan, but the longer the compilation time. Currently, database administrators must decide what the right optimization level is by trying to trade off the estimated compilation time against possible improvements in execution time. To automate such decisions, a meta-optimizer (MOP) is used.

Just as plan execution costs are estimated in a query optimizer, an essential component in a MOP is a compilation time estimator (COTE). FIG. 1 describes how such an estimator can be used in a simple MOP to choose between two levels of optimization. MOP first compiles the query at the low level 102 and obtains an estimate (measured by time) of the execution cost (call it E 104) of the best plan it finds. Then, the MOP calls the COTE to obtain the compilation time estimate (call it C) of the query at the high level 106. MOP then compares E with C 108 to decide whether to reoptimize the query at the high level. For example, if C is larger than E 110, then there is no need for further optimization since the query can complete execution by the time high-level optimization finishes. It is possible that a query can take longer to compile than to execute, especially when the query is complex, yet very selective, or when users only want to see the top n rows. On the other hand, if C is much smaller than E 112, reoptimizing the query at the high level gives the potential of further reducing E with only a relatively small cost (C). A more advanced meta-optimizer can be built by exploiting additional information, such as whether a query is static or dynamic (it's worthwhile to spend more time optimizing a static query, since the query is likely to be executed repeatedly), wherein the meta-optimizer estimates potential gains in plan quality for each optimization level.

A COTE can be used for many other applications. For example, the paper by Kabra et al. entitled "Efficient Mid-Query Re-Optimization of Sub-Optimal Query Execution Plan" teaches that it is useful to evaluate the need for mid-query reoptimization, in which an optimizer tries to generate a new plan in the middle of execution if a significant cardinality discrepancy is discovered. Since reoptimization itself takes time, the decision on whether to reoptimize or not is better made by comparing the execution cost of the remaining work with the estimated time to recompile.

Estimating the compilation time is also very useful for workload analysis tools. Examples of these tools are advisors for indexes (see papers by Chaudhuri et al. titled "Microsoft Index Tuning Wizard for SQL server 7.0" and Valentin et al. entitled "DB2 Advisor: An Optimizer Smart Enough to Recommend its Own Indexes"), materialized views (see paper by Agarwal et al entitled "Automated Selection of Materialized Views and Indexes in SQL Databases"), and partitioning (see paper by Rao et al. entitled "Automating Physical Database Design in a Parallel Database") that have been built on top of commercial database systems. All these tools spend most of their time compiling (but not executing) a large number of queries in the input workload as part of their tuning analysis, and may run for hours or even days, depending on the workload. A COTE can be used to forecast how long such a tool will take to finish and possibly to show the progress of the tool as well.

In this section, an overview is provided outlining how the dynamic programming search algorithm works. Then, previous attempts to estimate optimization complexity are explained, including why such prior art solutions are not sufficient.

Since the join operation is implemented in most systems as a diadic (2-way) operator (referred to as join, binary join, or join pair in this document), the optimizer must generate plans that transform an n-way join into a sequence of 2-way joins (referred to as join sequences in this document) using binary join operators. For most (inner) joins, the operands may be permuted, i.e., the join operation is commutative and associative. Therefore, complex queries typically have a large number of possible join sequences. The two most important tasks of an optimizer are to find the optimal join sequence as well as the optimal implementation (referred to as join method in this document) for each binary join. Dynamic Programming (DP) was first used for join enumeration in System R (see above-mentioned paper by Selinger et al.). The essence of the DP approach is based on the assumption that the cost model satisfies the principle of optimality, i.e., the subplans of an optimal plan must be optimal themselves. Therefore, in order to obtain an optimal plan for a query joining n tables, it suffices to consider only the optimal plans for all pairs of non-overlapping m tables and n-m tables, for m=1, 2, . . . , n-1.

To avoid generating redundant plans, DP maintains a memory-resident structure (referred to as MEMO, following the terminology used in the paper by Graefe et al. entitled "The Volcano Optimizer Generator: Extensibility and Efficient Search") for holding non-pruned plans. Each MEMO entry corresponds to a subset of the tables (and applicable predicates) in the query. The algorithm runs in a bottom-up fashion by first generating plans for single tables. It then enumerates joins of two tables, then three tables, etc., until all n tables are joined. For each join it considers, the algorithm generates join plans and incorporates them into the plan list of the corresponding MEMO entry. Plans with larger table sets are built from plans with smaller table sets. The algorithm prunes a higher cost plan if there is a cheaper plan with the same or more general properties for the same MEMO entry. Finally, the cheapest plan joining n tables is returned.

Most of the compilation time is spent on join optimization (which includes both join enumeration and plan generation). Our experimental study on DB2 confirms such an observation. FIG. 2 gives a breakdown of the compilation time for a real query workload. More than 90% of the time is either directly or indirectly spent on generating and saving join plans of different types. Ono and Lohman in the paper entitled, "Measuring the Complexity of Join Enumeration in Relational Query Optimization," introduced a key finding that optimization complexity is not determined by the total number of complete join trees that can be formed, but by the number of distinct binary joins. This is because the principle of optimality allows smaller subplans (cached in MEMO) to be "shared" by multiple larger plans. For example, for a query joining four tables A, B, C, and D together, the plan for a join between A and B can be used in join (AB,C) as well as in join (AB,D). Hence, they attempt to estimate the compilation complexity of a query by the number of joins enumerated. The underlying assumption being that the cost of optimizing each join is approximately the same. These attempts suffer from the following limitations:

Determining the number of joins from a general join graph is a hard problem. Although there are closed formulas for certain special classes such as the linear and the star-shaped queries (see papers by Ioannidis et al. entitled "Left-Deep vs. Bushy Trees: An Analysis of Strategy Spaces and its Implication for Query Optimization" and the above-mentioned paper by Ono et al.) and polynomial-time algorithms for counting the number of joins for queries with an acyclic join graph (see paper by Galindo et al. entitled "Uniformly-Distributed Random Generation of Join Orders"), counting the number of different joins with cycles in the join graph is as hard as counting Hamiltonian tours in a graph. The problem is #P-complete, which is even harder than NP-Hard (see paper by Jerrum entitled "Counting Trees in a Graph is #P-Complete"). Cycles are common in real queries because of automatic query generation tools as well as implied predicates computed through transitive closure in commercial systems. To make matters worse, optimizers in real systems are typically customized by various "knobs" and may not implement a full dynamic programming algorithm. For example, one such knob may limit the number of tables joined in the composite inner of bushy plans. Another example is that the optimizer may only support free-reordering plans for outer-joins, but not full reordering with compensation such as generalized outerjoins (see paper by Galindo et al. entitled "Outerjoin Simplification and Reordering for Query Optimization"). All these variants make estimating the number of joins a very difficult problem.

A more severe problem is that, even if the number of joins in a query is estimated correctly, the cost per join is far from uniform. Furthermore, each join typically generates a different number of plans depending on various "interesting" properties that need to be kept. Such properties are extensions of the important concept of interesting orders (see above-mentioned paper by Selinger et al.) introduced in System R. Suppose there exist two plans generated for table R, one ordered on R.a (call it p1) and the other is not ordered (call it p2). Also, suppose that p1 is more expensive than p2. Normally, p1 should be pruned by p2. However, if table R can later be joined with table S on attribute a, p1 can actually make the sort-merge join between the two tables cheaper than p2 since it doesn't have to sort R. To avoid pruning p1, System R identified orders of tuples that were potentially beneficial to subsequent operations for that query (hence the name interesting orders), and compared two plans only if they represented the same expression and had the same interesting order. This causes the number of plans generated for each join and stored in MEMO to vary. FIG. 3a illustrates a 3-way join query and the plans kept in the corresponding MEMO structure. A list of plans is stored for each MEMO entry, each carrying a different order property that is still interesting. A DC value is used to represent a "don't care" property value, which corresponds to all retired orders (orders no longer useful for subsequent operations such as joins) or no order at all. The cheapest plan with a DC property value is also stored in each MEMO entry if this plan is cheaper than any other plan with interesting orders. Modifying the query to that in FIG. 3b, by adding an orderby clause, increases the number of interesting order properties that need to be kept in all MEMO entries containing A. By comparing FIG. 3a with FIG. 3b, it is seen that the number of generated join plans changes, even though the join graph is still the same.

The following references provide for a general teaching in the area of optimization of database queries.

The U.S. Pat. No. 5,301,317 to Lohman et al. discloses a system providing automatic adjustment of resources devoted to query optimization according to estimated query execution time. The described system permits the query optimizer to automatically trade off the time spent estimating the execution cost of alternate query execution plans against the potential savings in execution time that one of those alternate plans may yield. The number of alternate plans considered is adjusted by selecting compile-time parameters and heuristic criteria for limiting the primitive database operators used in the alternate plans, thereby establishing a new search space. The parameters and criteria are adjusted according to the estimate of execution cost for the optimal plan from a first search space.

The U.S. Pat. No. 5,335,345 to Frieder et al. discloses a method for executing a query comprising a sequence of operations to be performed on one or more relational databases. The steps of the method comprise statistically sampling the relational databases at the times the operations are to be executed and then dynamically optimizing the performance of the operations based on the statistical samples obtained as a result of the sampling step.

The U.S. Pat. No. 5,412,806 to Du et al. discloses a programmable machine system and method for managing electronic data access among multiple different relational databases in a network distributed database environment. The machine is programmed so that it can construct cost-effective access strategies for any of the participating databases absent any DBMS-specific cost models. The system provides query optimization across different database management systems in a network-distributed database environment based on a calibrating database relying only on typical relational database statistics. Cost data is developed by running queries in the various databases against the calibrating database.

The U.S. Pat. No. 5,694,591 to Du et al. discloses a method for optimizing data retrieval from a multi-database system by restructuring a database query tree to optimize query response time in a two-step optimization process.

The U.S. Pat. No. 6,026,391 to Osborn et al. discloses a query performance prediction (QPP) module that is a part of an applications layer residing on respective user stations operating in conjunction with a centralized host computer system. The QPP module correlates estimated system cost information (for a database query provided from a database management system associated with the computer system) with statistics compiled from previous queries in order to estimate the system response time.

The U.S. Pat. No. 6,345,267 to Lohman et al. discloses a relational database management system that includes a query processor that uses a query operator partition property to perform QEP pruning and to ensure that data input to a query operator is partitioned appropriately for the operation. The partition property indicates the group of network nodes across which a table is distributed. The query processor also makes use of partition classes that are designated "interesting classes" to perform preoptimization planning, query pruning, and look-ahead partitioning (based on partition classes that are identified as being of interest to future operations), thereby more efficiently evaluating complex query statements in an MPP, shared-nothing environment.

The U.S. Pat. No. 6,351,742 to Agarwal et al. provides for a method and system for optimizing the execution of database statements are described. An execution plan is generated for a database statement, wherein the database statement contains a predicate having one or more arguments whose values are not known at the time the execution plan is generated (e.g., at compile time).

The U.S. Pat. No. 6,353,818 to Carino provides for a method comprising the steps of generating a plurality of query plans for the database query, evaluating the plurality of query plans using a measured value for the resource metric, selecting a query plan from the evaluated query plans based on the measured resource metric, and executing the selected query plan.

The U.S. Pat. No. 6,397,204 to Liu et al. provides for a method for joining a multi-column table and at least two satellite tables, wherein each satellite table is comprised of multiple rows and at least one join column and each multi-column table is comprised of multiple rows and join columns corresponding to the join columns in the satellite tables.

The US patent publication to Haas et al. (2001/0037327) provides for selectivity estimation for processing SQL queries containing a HAVING clause in an SQL query.

The paper by Polyzotis et al. entitled "Statistical synopses for graph-structured XML databases" provides for statistical synopses for graph-structured XML databases. In the paper entitled, "Query processing and optimization on Oracle Rdb", Antoshenkov et al. teach query processing and optimization in the Oracle® database. In the paper entitled, "A comparison of selectivity estimators for range queries on metric attributes", Blohsfeld et al. provide a comparison of nonparametric estimation methods for computing approximations of the selectivites of queries, in particular, range queries. In the paper entitled, "Selectivity estimation for spatio-temporal queries to moving objects", Choi et al. provide for a query optimizer that requires selective estimation of a query to choose the most efficient plan. Swami in the paper entitled "Optimization of Large Join Queries: Combining Heuristics and Combinatorial Techniques" teaches the use of heuristics in optimizing queries with a large number of joins. Ioannidis et al., in the paper entitled "Randomized Algorithms for Optimizing Large Join Queries," teach query optimization for relational database systems as a combinatorial optimization problem.

The IBM technical disclosure bulletin entitled "Heuristic Method for Joining Relational Database Tables" provides for a method (specifically, a greedy method) for joining tables responsive to relational queries. The disclosed method iteratively estimates the cost of all joins it can perform and identifies the cheapest join, without concern for the impact that a particular choice has on future joins.

Whatever the precise merits, features, and advantages of the above cited references, none of them achieves or fulfills the purposes of the present invention.

SUMMARY OF THE INVENTION

The present invention provides for a compilation time estimator (COTE) and a method implemented in the COTE for estimating optimization complexity by estimating the number of distinct join plans that will be generated, rather than the number of join sequences. The join enumerator in an optimizer is reused to iterate all the join pairs, but plan generation is bypassed. A small number of differentiating properties are accumulated during enumeration to calculate the number of generated plans for each enumerated join. Hence, instead of estimating the number of join sequences, the present invention's COTE estimates the number of join plans (a finer granularity). Since the cost of generating a join plan is much more uniform than that of a join sequence, the estimator provides more accurate compilation time estimation.

The method of the present invention comprises the steps of:

a) reusing the existing join enumerator in an optimizer to iterate through all the possible join sequences, but bypassing the expensive plan generation step (to avoid the overhead of space allocation and cost estimation, etc);

b) determining a small number of differentiating properties (e.g., properties used to distinguish plans) that affect the number of plans generated for each join sequence and using those factors to calculate the number of generated plans; and c) estimating the compilation time from the number of generated plans using a regression model (e.g., a linear regression model on the number of generated plans for each type of join method).

The compilation time estimator (COTE) of the present invention can be used for many other applications. For example, the COTE is useful in evaluating the need for mid-query reoptimization, in which an optimizer tries to generate a new plan in the middle of execution if a significant cardinality discrepancy is discovered. Since reoptimization itself takes time, the decision on whether to reoptimize or not is better made by comparing the execution cost of the remaining work with the estimated time to recompile.

Estimating the compilation time is also very useful for workload analysis tools. Examples of these tools are advisors for indexes, materialized views, and partitioning that have been built on top of commercial database systems. All these tools spend most of their time compiling (but not executing) a large number of queries in the input workload as part of their tuning analysis, and run for hours or even days, depending on the workload. A compilation time estimator (COTE) is used to forecast how long such a tool would take to finish and possibly to show the progress of the tool as well.

BRIEF DESCRIPTION OF THE DRAWINGS

FIG. 4 illustrates an algorithm for estimating the number of plans considering one type of physical property P.

FIGS. 5a-c collectively illustrate graphs showing a comparison of overhead (of compilation time estimation) with actual optimization.

FIGS. 6a-i collectively illustrate graphs showing the accuracy of the estimated number of join plans.

DESCRIPTION OF THE PREFERRED EMBODIMENTS

Figure 1:
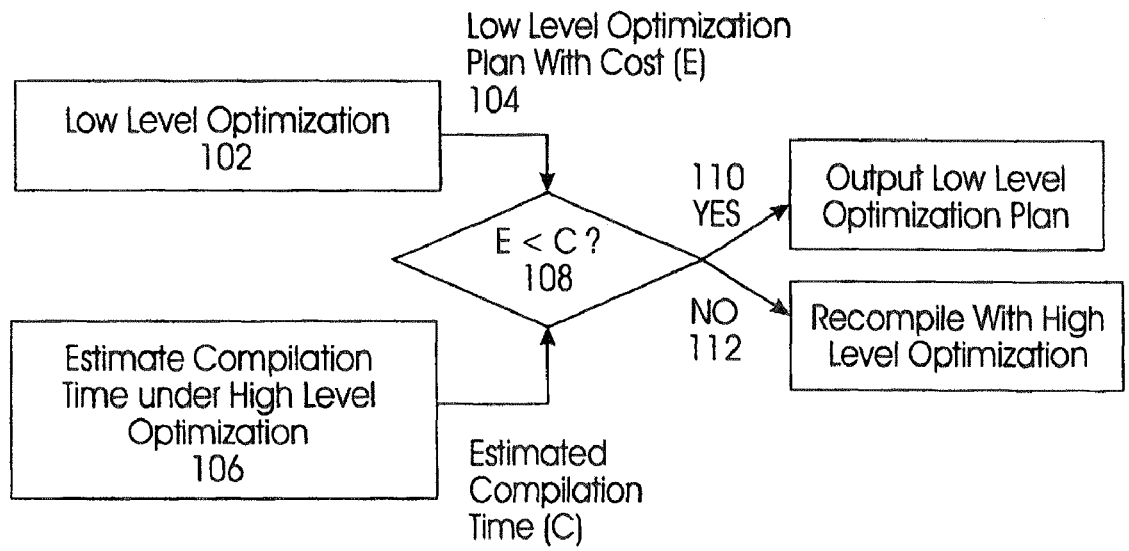
FIG. 1 illustrates a simple architecture of a meta-optimizer.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that for expository purposes, the specification is focused on a conventional dynamic programming style join enumerator as it is widely used in both commercial and research database systems. However, the disclosed approach can be used in conjunction with other kinds of enumeration without departing from the scope of the present invention. Furthermore, the terms "plan" and "join plan" interchangeably throughout the specification.

Figure 2:
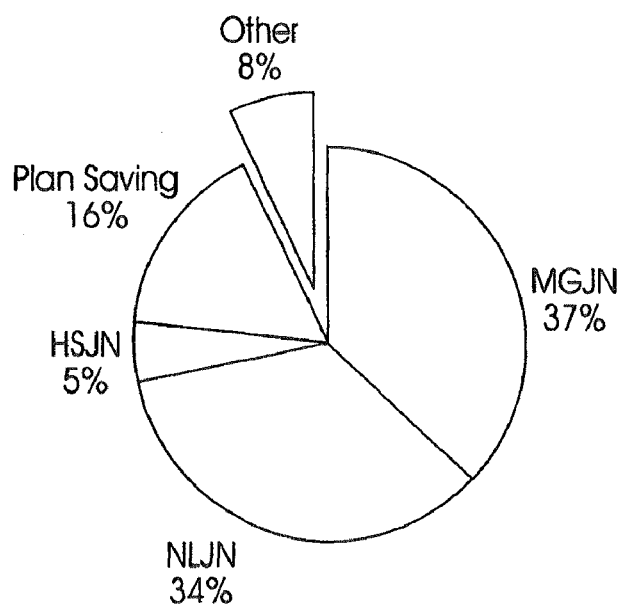
FIG. 2 illustrates the compilation time breakdown for a customer workload on DB2®.

The present invention's Compilation Time Estimator (COTE) overcomes the problems illustrative of the prior art by estimating the compilation time in terms of the number of plans. It should be stressed that it is the number of generated plans (which is much more than those kept in the MEMO structure) that is to be estimated. Non-join plans (e.g., table scan plans and index scan plans) are typically much fewer than join plans in complex queries, which is the hard case, and thus take much less compilation time (a small fraction of the time in the "other" category in FIG. 2). Commercial systems typically consider only a limited number of combinations of index plans (index ANDing and ORing) for practical reasons. Second, the number of non-join plans is much easier to estimate. For example, there are typically two group-by plans—one sort-based and one hash-based—for each aggregation that needs to be performed in the query. The number of index plans can be estimated by counting the set of applicable indexes (either because certain predicates can be pushed to indexes or an index-only plan can be used). Therefore, when necessary, non-join plans can be included in the present invention's model.

While estimating the number of joins for any given query is quite hard, a join enumerator of an optimizer knows how many joins it considers once it iterates through all possible joins. However, two questions are of interest: (1) how expensive is a join enumerator?; and (2) how feasible is it to exploit the join enumerator in a real system?

Despite the fact that join enumeration time may grow exponential in the number of tables in a query, join enumeration itself only takes a small fraction of the total compilation time. It can be seen from FIG. 2 that join enumeration time is only a small portion (less than 20%) of the "other" category. Plan generation, on the other hand, dominates join optimization time. Detailed analysis shows that a large amount of time in generating a plan is spent on estimating the execution cost. Execution cost estimation is the foundation of any cost-based optimizer, and commercial systems build sophisticated execution cost models to make sure that their cost estimates are close to reality. Such developments as sophisticated disk drives, innovative buffer management, and new types of histograms all contribute to the complexity of a cost model. Therefore, as long as plan generation is bypassed, reusing join enumeration is not expensive.

A join enumerator is reusable as long as the number of joins enumerated doesn't depend on information present only in generated plans (such as estimated execution costs). It should be noted that it is fine if a join enumerator only changes the relative order of joins enumerated based on plan-dependent information, since this doesn't affect the compilation complexity. Join enumeration is usually performed on a logical basis, i.e., two sets of tables may be joined as long as they don't overlap and there is at least one feasible join predicate linking the two sets (assuming Cartesian product is not allowed).

It should be noted that the design of many extensible optimizers (see paper by Lohman entitled "Grammar-like Functional Rules for Representing Query Optimization" and the above-mentioned paper by Graefe et al.) decouples join enumeration from plan generation. The separation between the two aspects allows for greater flexibility and extensibility of the query optimizer. For example, the join enumeration algorithm can be modified without affecting how joins are implemented, and a new join method can be easily introduced without modifying the enumeration code. There is only a thin interface between the enumeration and the plan generation component. In such systems, bypassing plan generation is accomplished in a simple manner.

Reusing existing join enumeration provides two advantages: (1) the compilation time of any query can be estimated without relying on any assumption about the shape (linear, star, etc.) or connectivity of the query graph; and (2) the number of joins enumerated are consistent with all the customizations of the enumeration algorithm, and thus can reflect the real complexity of compiling a query.

The idea of interesting orders was later generalized to multiple physical properties and is used extensively in modern optimizers (in the paper by Graefe et al. entitled "The Exodus Optimizer Generator" and the paper by Lohman entitled "Grammar-like Functional Rules for Representing Query Optimization Alternatives"). Intuitively, a physical property (hereby also referred to as a differentiating property) is a characteristic of a plan that is not shared by all plans for the same logical expression (corresponding to a MEMO entry), but can impact the cost of subsequent operations. The term physical property as used in this patent specification broadly refers to any property that violates the principle of optimality; such a property need not be physical. Hereafter, "physical property" is simply referred to as "property" when the meaning is clear from the context.

The presence of physical properties (identified via a property identifier) can significantly affect the number of join plans generated and stored in the MEMO structure. The analysis presented in the paper by Ganguly et al. entitled, "Query Optimization for Parallel Execution", shows that the number of bushy join plans generated when taking physical properties into consideration is on the order of $O(kn^3)$ for a linear-shaped query and $O(kn2^n)$ for a star-shaped query, where n is the number of tables and k is the upper bound of physical properties associated with each join. It should be noted that k is independent of n (i.e., the number of interesting orders is determined primarily by the number of predicates, not by the number of tables) and can be an important or even dominant factor for relatively small n (less than 100), which is typical for join queries. This is especially true when multiple types of physical properties are kept together, which creates a combinatorial explosion. In contrast, "logical" properties such as cardinalities, keys, and functional dependencies (FDs) in general have the same value for the same logical expression, and therefore don't increase the number of plans for a join. Logical properties can affect the time needed to generate a plan though. For example, a plan with many keys and FDs might take longer to generate than a plan with no keys and no FDs at all. However, logical properties may be computed once for each MEMO entry (through property caching), rather than for each join.

Figure 3A:
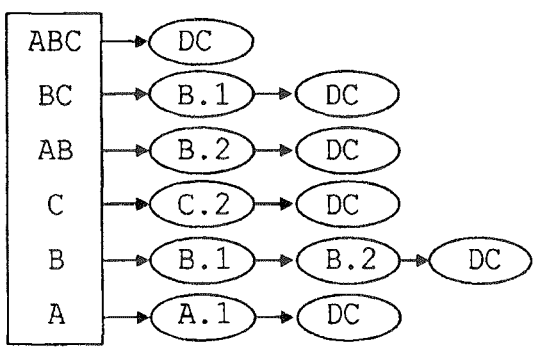
FIGS. 3a-b illustrate a MEMO structure for each of 2 queries having 4 joins.
Figure 3B:
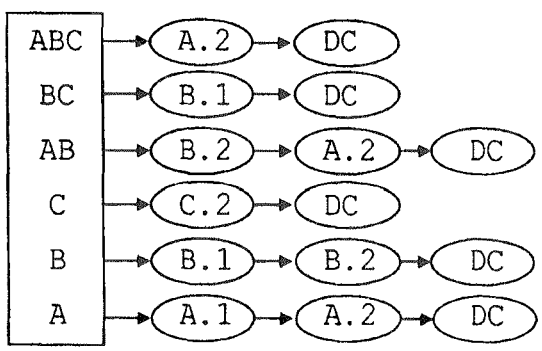

Table 1, provided below, summarizes a non-exhaustive list of physical properties and their applications. Similar to interesting orders, each physical property has its own concept of being interesting. This is described in the third column in Table 1. Interesting properties can "retire", i.e., they are no longer useful for any of the remaining operations. In FIG. 3, it is seen that retired orders are not carried around in the MEMO structure any more. Two important aspects of interesting properties are how they are generated during planning, and how they are propagated by various join methods. Both the property generation policy and the propagation character affect the present invention's plan estimation.

TABLE 1

| Physical Property | Its Application | Interesting characteristics |
|---|---|---|
| Order | optimizing queries relying on sort-based operations | an order with column matching the join column of a future join, the grouping attributes (from the groupby clause), and the ordering attributes (from the orderby clause) |
| (data) partition | optimizing queries in a parallel database | a partition with partitioning keys matching the join column of a future join, the grouping attributes, and/or the ordering attributes (depending on whether it's a range partition or a hash partition) |
| pipelineability | optimizing queries asking for the first n rows | if pipelineable, i.e., no SORTs, builds for hash joins or TEMPs that require full materialization |
| Data source | optimizing queries on heterogeneous data sources | any data source |
| Expensive predicates | allowing expensive predicates to be applied after joins | any subset of the expensive predicates |

Two kinds of property generation policies need to be distinguished. An interesting property can be generated in a lazy fashion, in which it is only generated naturally, or an eager fashion, in which the optimizer tries to force the generation of a property if it is not naturally present. For example, under a lazy policy, interesting orders generated include those that result from an index scan or a sort-merge join. In contrast, under an eager policy, if an interesting order does not exist naturally, the optimizer will add a SORT operator on top of a plan to force that order to exist. There are tradeoffs between the two policies. The eager one generates a larger search space and, hence, may significantly increase optimization time. The lazy policy reduces the number of plans generated, at the risk of missing good plans. The decision of which policy to take is system-dependent, and is typically made heuristically by considering the cost of enforcing a property and the potential benefit it can bring.

Interesting properties are propagated differently by different types of join method. Again, take the order property for example. A nested-loops join (NLJN) can always propagate the order from its outer input. Since a sort-merge join (MGJN) requires both inputs to be sorted, it can only propagate orders corresponding to join columns of this particular join. Hash join (HSJN) in general destroys any order property, unless the inner table fits entirely in memory, which is hard to guarantee at compilation time. Accordingly, the way that a join method propagates properties is categorized into three classes: full, partial and none. Table 2, provided below, summarizes the propagation characterization of some physical properties.

TABLE 2

| Join Method/Property | Order | Partition |
|---|---|---|
| NLJN | Full | Full |
| MGJN | Partial | Full |
| HSJN | none | Full |

For each join being enumerated, the number of join plans generated depends on the number of distinct interesting properties of P in both join inputs. One way to count the number of interesting properties for each enumerated join is to always recompute it on-the-fly from a collection of all possible property values of P, and filtering out retired properties. Even though this approach doesn't use any additional space beyond the MEMO structure itself, it is not efficient because it performs a lot of redundant computation. It should be noted that a property retired by a logical expression can never be interesting again for a subsuming logical expression. To exploit that feature, an interesting property value list is accumulated for each MEMO entry bottom-up, and such a list is used from lower MEMO entries to compute the list for upper MEMO entries. This requires some additional space overhead and is a classical technique of trading space for time. Compared with the size of a full plan (typically in the order of hundreds of bytes), each property takes a much smaller amount of space (typically 4 bytes).

Initially, the interesting property value list is populated for MEMO entries for a single table. This actually depends on the property generation policy. If a lazy policy is used, natural physical properties are collected based on the physical configuration (such as indexes and partitions defined) of the underlying table. Otherwise, the logical expression of the query is looked at and interesting properties are pushed down to base tables, which can normally be done in one top-down traversal of the internal representation of the query (the paper by Simmen et al. entitled "Fundamental Techniques for Order Optimization" describes such an approach of pushing interesting orders to base tables).

For each join (S,L) (both S and L are sets of tables) enumerated, interesting property values of MEMO entries are propagated for S and L to that of the MEMO entry for S∪L. First, it is confirmed that a property value p, from the input, can be propagated by at least one join method and then make sure that it is not retired by the join. Finally, a check is performed to see if p is redundant by testing its "equivalence" with other properties already in the interesting property list of S∪L. It should be noted that joins can change property equivalence. For example, two distinct orders on R.a and on S.a become equivalent after the join predicate R.a=S.a is applied. Therefore, equivalence needs to be checked for each enumerated join.

Instead of keeping one count for all join plans, a separate count is kept for each type of join method. This is because: (1)

each type of join may generate a different number of plans, depending on its own property propagation policy; and (2) the cost of generating a join plan may not necessarily be the same for all join methods in real systems. For each candidate join, if a join method fully propagates P, the number of distinct interesting properties from the join inputs is used as an estimate for the number of join plans. Further, the count is incremented by one assuming that one additional plan will be generated for the DC property value introduced earlier. If a join method partially propagates P, the plans using a subset of interesting properties from the inputs (namely, those that can be propagated) is estimated. Finally, for a non-propagating join, the count is incremented by one.

One issue arises because of property subsumption (see above-mentioned paper by Simmen). A subsumption operator $\prec$ is defined between two properties p1 and p2: $p1 \prec p2$ if p2 is more general than p1. For example, an order on (R.a, R.b) (o1) is more general than that on R.a (o2) and therefore $o2 \prec o1$. Property subsumption is relevant to join methods that partially propagate properties. Take for instance a MGJN between R and S using a join predicate R.a=S.a. Normally, only o2 can be propagated by the sort-merge join. However, if a subsuming interesting order property o1 is present (e.g., because of orderby), o1 will be propagated as well. This is because when the sort-merge join requests a plan ordered on o2, a plan ordered on o1 (since it is more general than o2) will be returned as well. As a result, two MGJN plans, instead of one, will be generated. To account for this, for a partial join, a coverage list is computed, which includes all interesting property values subsuming those propagatable by the join. The number of plans generated by the partial join is then increased by the length of the computed coverage list.

The general framework of the present invention is summarized in FIG. 4. Two new functions initialize( ), and accumulate_plans( ) are introduced. The first function is called every time the join enumerator creates a new MEMO entry. It allocates space for an interesting property list of P and initializes the list for single-table MEMO entries, based on the generation policy of P. The second function is called for each enumerated join (S,L) (assume that both S and L can serve as the outer for now). The function first tries to propagate interesting property values from the inputs. A property is propagated if it is propagatable by at least one type of join method, has not been retired by the join, and is not equivalent to any property already propagated. The algorithm then accumulates plan counts for each type of join, based on how it propagates properties. Even though our algorithm is based on a MEMO structure for a single query block, it can be easily extended to handle multiple query blocks for more complex queries.

The framework outlined in FIG. 4 can be extended to estimate generated plans for multiple physical properties. One solution is to treat multiple physical properties as a single "compound" property, wherein the algorithm of FIG. 4 is reused. In the algorithm, instead of storing single property values in the MEMO structure, vectors containing multiple property values are stored, each corresponding to a different type of physical property. A compound property is retired only when all values in the vector are retired. The interesting property lists in the MEMO structure become longer because of the combinatorial effect of multiple properties.

Certain types of physical properties are orthogonal to one another. The order property and the partition property in a shared-nothing parallel database system is a specific example. While the partition property designates how data is distributed across all the nodes, the order property specifies how data is sorted on each individual node. An interesting order property value can always coexist with any interesting partition property value and vice versa (data satisfying a specific partition can be first redistributed, followed by sorting data at each node to satisfy a specific order). In this situation, two separate interesting property lists are maintained, one for each orthogonal type of physical property. This saves both time and space during plan estimation, since the steps of generating and storing property combinations are avoided. The number of plans can then be estimated by multiplying the length of the two interesting property lists. Sometimes an interesting property combination can include a retired individual property. If separate interesting property lists are kept, no individual retired property value can exist in the MEMO structure. Therefore, this approach tends to underestimate the number of plans.

To translate the estimated number of plans to an estimate of the compilation time, a simple model is used:

$$T = T_{inst} \times \Sigma(C_t \times P_t),$$

where $T_{inst}$ is the time per instruction (a machine-dependent parameter), $C_t$ is a constant representing the number of instructions to generate a join plan of type t, and $P_t$ is the estimated number of join plans of type t. In order to obtain $C_t$, the real counts of generated join plans were collected together with the actual compilation time for a set of training queries, and $C_t$ was calculated by running regression on our model. It should be noted that the regression is rerun to obtain a new set of $C_t$ for new releases of a database system, since the time to generate a join plan is likely to change.

In order to validate the present invention's approach, the methods described were implemented on DB2®.

DB2 uses a conventional bottom-up dynamic programming join enumeration algorithm. It has a serial version and a parallel version. Two important kinds of physical properties exist: order and partition (in the parallel version). In the serial version, order is considered as the only type of physical property. In the parallel version, both the order and partition are considered as properties.

To count the number of plans generated, a new plan counting mode is introduced in the optimizer. In this mode, the code is instrumented in the join enumerator to call the initialize( ) and the accumulate_plans( ) functions, instead of the normal plan generation function in this mode.

The parallel version of DB2 uses a typical shared-nothing architecture (see paper by Baru et al. entitled "DB2 parallel edition database systems: The Future of High Performance Database Systems"). The order property and the partition property are treated as independent and two separate interesting property lists are kept in the MEMO structure. The partition property is generated lazily, so the physical partition of each table is used to initialize the interesting partition value list of its MEMO entry. One subtlety arises during our implementation. Because of a heuristic rule exploited in DB2, additional interesting partitions can sometimes be generated. Consider a join between two tables R and S. If neither R nor S is partitioned on the join column, the optimizer will try to repartition R and S on the join column, and thereby creating a new partition property value. To determine whether repartitioning might happen for a join, a test is performed to see if any join column is used as the partitioning key in any of the interesting partition property values from the inputs. Additional partitions are propagated on join columns if the test fails.

DB2 supports all of the above-mentioned three types of join methods. Regression tests are run based on the above-mentioned model to obtain two sets of $C_t$, one for the serial version and the other for the parallel version, because generating a plan is typically more expensive in the latter. In the current release of DB2, the ratio of $C_m:C_n:C_h$ ($C_m$ for MGJN, $C_n$ for NLJN and $C_h$ for HSJN) is 5:2:4 for the serial version and 6:1:2 for the parallel version.

Tests were conducted on a level of optimization that uses dynamic programming with certain limits on the composite inner size of a join. All experiments were performed on a UNIX machine with two 400 MHz processors and 1 GB of RAM. The parallel version was set up on four logical nodes, all running on the same machine. Tests were conducted on a wide range of workloads, but selected a representative subset to present here. The following summarizes the workloads that were selected.

Synthetic Workloads: Workloads were generated with two predefined join graphs: linear-shaped and star-shaped queries (referred to herein as linear and star respectively). In the linear workload, N tables are joined in a sequential fashion (first table is joined to the second table and the second table is joined to the third, etc.). In the star workload, one table serves as the center table and all other tables are joined to the center table. In each workload, the number of tables, the number of join predicates, and the number of columns are varied in the orderby clause and the groupby clause. In the following experiments, 15 queries were selected from each workload. The queries are in three batches of five. Each batch joins the same number of tables, but varies the number of join predicates from 1 to 5. The number of tables joined for the three batches are 6, 8, and 10.

Real Workloads: Two real customer workloads were selected. The first one consists of 8 queries (real1) and the second one consists of 17 queries (real2). Queries from both workloads are complex data warehouse queries with inner joins, outerjoins, aggregations and subqueries. To get a sense of query complexity, one query from the real2 workload consists of 14 tables constructed from 3 views, 21 local predicates and 9 groupby columns that overlap with the join columns.

Randomly Generated Workloads: A random query generator was used to test the robustness of DB2. The tool creates increasingly complex queries by merging simpler queries defined on a given database schema (the schema from real1 was used in our test), using either subqueries or joins, until a specified complexity level is reached. One important feature of the generator is that it tries to join two tables with a foreign-key to primary-key relationship or having columns with the same name. As a result, the queries produced are relatively close to real customer queries. This workload is referred to as random.

Benchmark Workloads: 7 queries having the longest compilation time are chosen from the TPC-H (see article entitled "TPC benchmarking H (decision support) Revision 1.1.0) benchmark.

Postfixes of "_s" and "_p" to the name of each workload are used to refer to a workload being tested on the serial and the parallel version of DB2, respectively.

First, the overhead of the COTE is evaluated and compared to the actual compilation time. In FIGS. 5a-c, the overhead of the COTE and the actual compilation time is compared for three different workloads. FIG. 5a and FIG. 5b give the results for linear and real2, respectively, both on the serial version. The time spent on COTE is between 1% and 3% of the actual compilation time. The overhead includes both the join enumeration cost and the cost of maintaining the interesting property value list in the MEMO structure. FIG. 5c shows the overhead for the real1 workload on the parallel version. The overhead is even smaller in the parallel version for two reasons. First of all, plan generation becomes more complicated in the parallel version and hence is more time consuming. Secondly, since the partition property is accumulated separately from the order property, the generation of all (partition, order) combinations is avoided during real optimization. This affects our plan estimation, as is seen later. Although not shown here, the overhead percentages on other workloads are similar. To summarize, the results prove that join enumeration, together with property accumulation, although of exponential complexity, is not the primary consumer of time in query optimization.

Figure 6A:
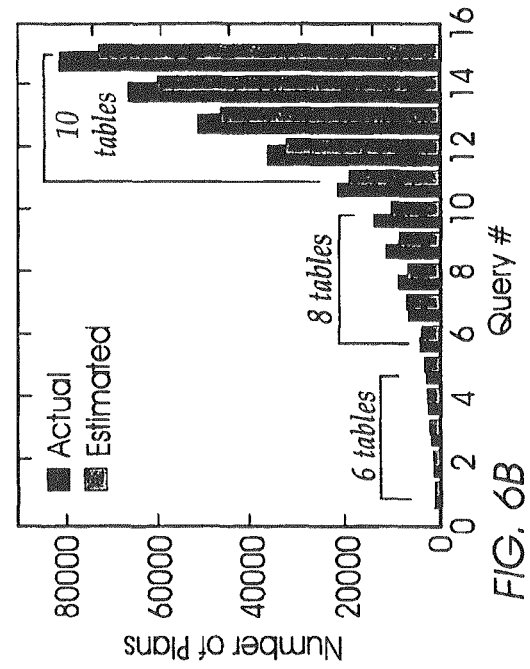
Figure 6B:
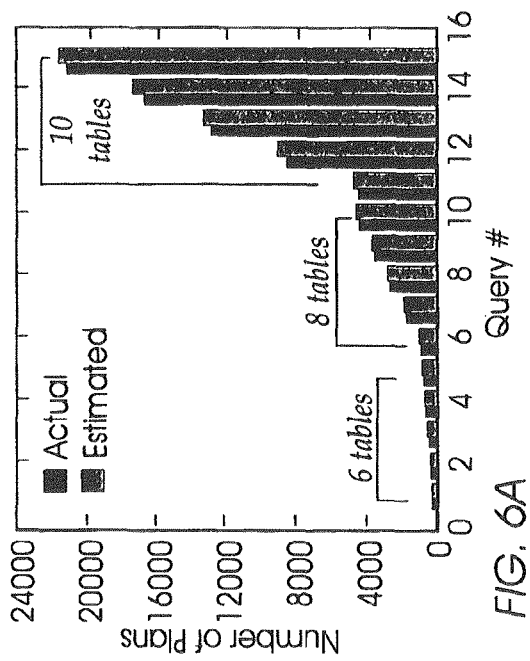
Figure 6C:
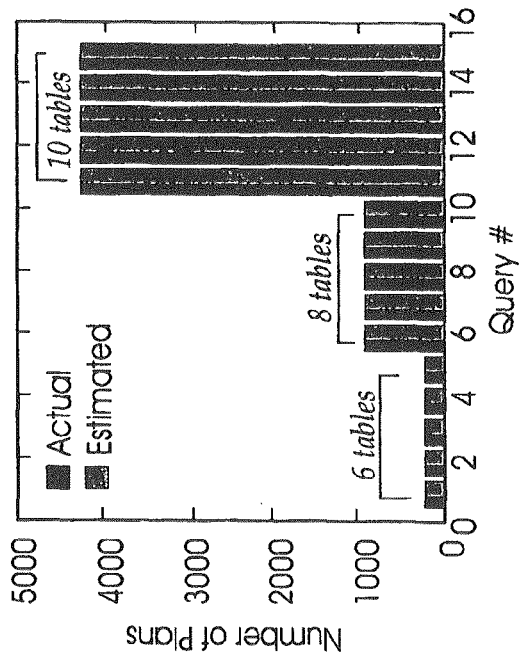

In this section, the accuracy of estimating the number of generated plans for each join method is evaluated. FIGS. 6a-c illustrates the results on the serial version running the star workload. The estimates are exact in the case of HSJN plans (FIG. 6c), because HSJN plans don't propagate interesting orders, and hence are exactly twice the number of enumerated joins. The estimated number of NLJN plans and MGJN plans are close to the actual ones—less than 30% error for NLJN and less than 14% error for MGJN estimates. One problem affecting the estimates for NLJN and MGJN is a plan "sharing" problem between two property values, one more general than the other. Consider the following example. Suppose that table R has two interesting orders: (R.a) and (R.a, R.b). It is assumed that two plans will be generated for NLJN (and for MGJN if (R.a) is a join column). However, if the cost of a plan (for R) ordered on (R.a, R.b) is cheaper, it will actually prune a plan ordered on R.a (assuming everything else is the same) because the former is more general than the latter. The problem can be thought of as the order on R.a sharing the same plan as the order on (R.a, R.b). The net result is that fewer join plans are actually generated than estimated based upon just the number of interesting orders. Since the COTE bypasses plan generation and, thus, does not have plan cost, it's difficult for it to tell whether a plan might be pruned. This explains why the number of MGJN plans were overestimated (FIG. 6a), but not the estimates for NLJN plans (FIG. 6b), which turn out to be lower than the actual numbers. The latter effect is attributed to an implementation oversight in DB2 that generated redundant NLJN plans during the actual optimization. Once the implementation is fixed, the actual number of NLJN plans will better agree with the estimates. Finally, the difference between the number of MGJN (NLJN) plans and the number of HSJN plans among queries in the same batch needs to be pointed out, even though they all have the same number of joins (FIGS. 6a-b vs. FIG. 6c).

Next, plan estimates and actual values for the random and real1 workloads in the parallel environment are presented in FIGS. 6d-f and FIGS. 6g-i, respectively. The results in both sets of figures are quite similar. It should be noted that in both cases, the HSJN numbers are no longer the same as the actual ones. This is because the cardinality estimation employed in plan-estimate mode is "simpler" than that used in real compilation. For example, it doesn't take into consideration the effect of keys and functional dependencies (since they are not propagated in the plan-estimate mode). It should also be noted that Joins enumerated in DB2 are affected by cardinality estimates due to heuristic rules such as allowing Cartesian products when one of the inputs has only one row. Therefore, sometimes an exact number of joins is not obtained in the plan-estimate mode, which directly translates into estimate errors of HSJN plans (between −2% to 24%). NLJN plans and MGJN plans are also affected, to a certain extent. In addition, because the order property and the partition property are maintained separately, plans generated carrying only an interesting order are ignored, but not an interesting partition, and vice versa. However, such errors tend to be relatively small. Finally, in FIG. 6e, NLJN has a few outliers where errors are more than 50%. These are the few cases where various kinds of errors accumulate, rather than cancel one another.

Figure 7A:
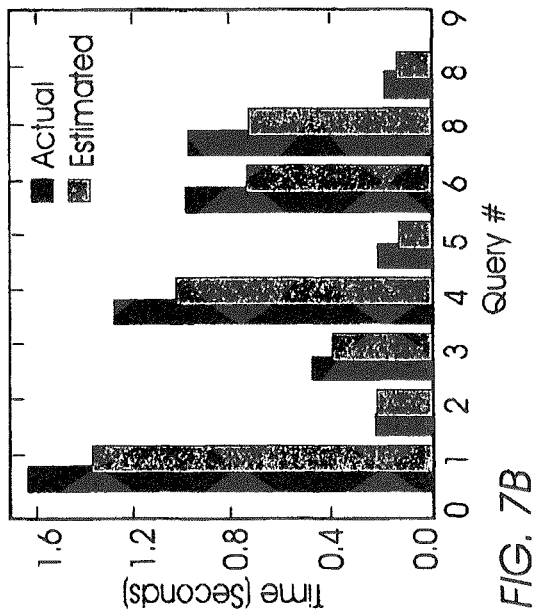
FIGS. 7a-f collectively illustrate graphs showing a comparison of actual and estimated compilation time.
Figure 7B:
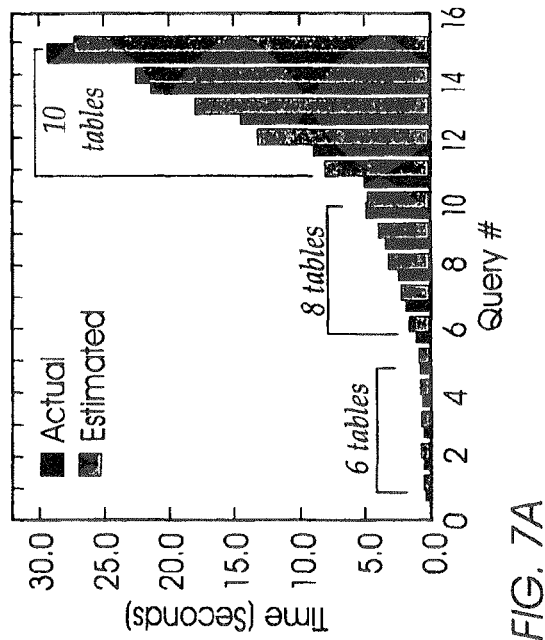
Figure 7C:
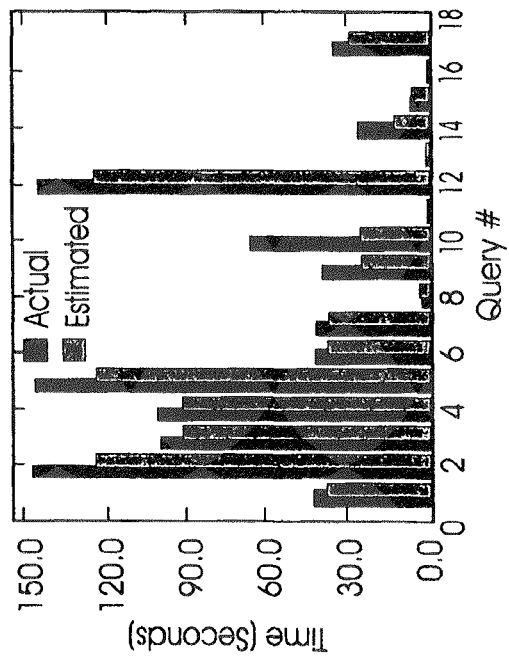

Compilation time estimation based on the plan estimates is now presented. FIGS. 7a-c show the time estimates on the serial version, for the star, real1 and real2 workloads, respectively. All estimates are within 30% of the actual compilation time, but are much better in many cases. It is noted that in FIG. 7a, for the star workload, the actual compilation time significantly differs among queries within each batch, and yet the estimates are able to correctly predict the trend. If compilation time was estimated using the number of joins only, errors of 20 times larger would have been observed, no matter how the time per join is chosen, because such a metric cannot distinguish queries within the same batch. The plan-level metric provides much more accurate estimation.

Figure 7D:
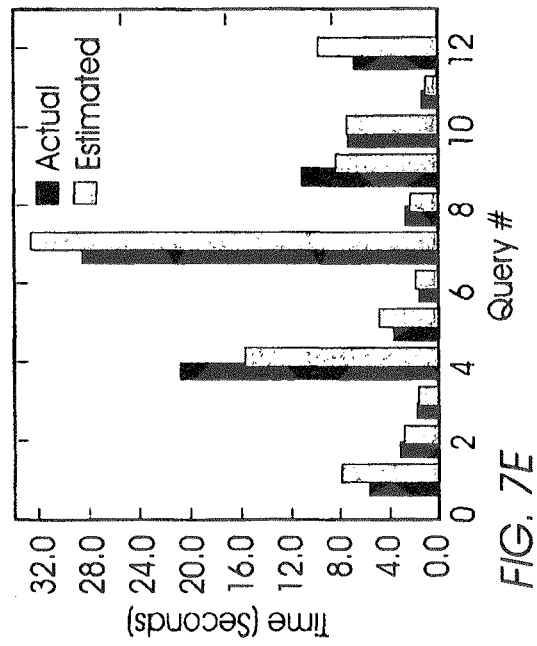
Figure 7E:
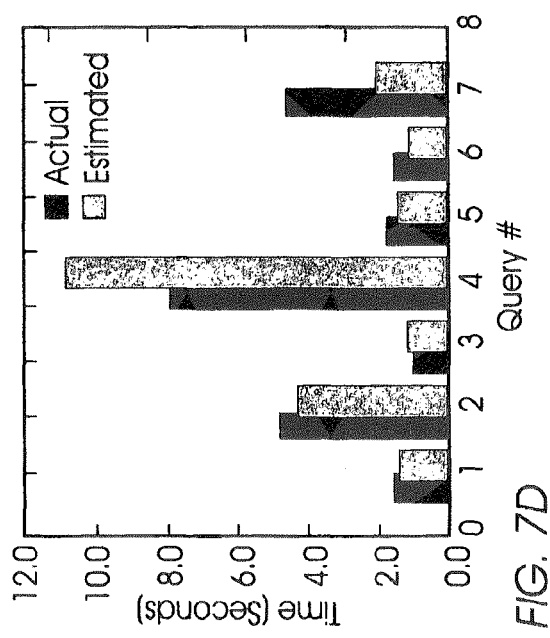
Figure 7F:
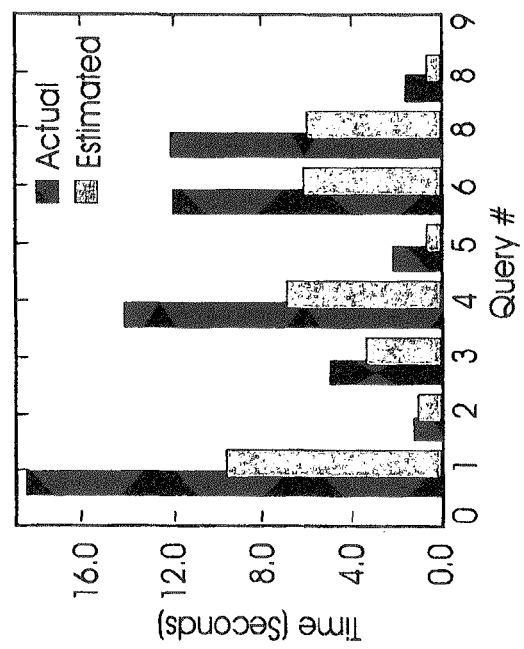

Finally, FIGS. 7d-f show results on the parallel version for the TPC-H, random, and real1 workloads. While a 30% estimation error is obtained in the first two workloads, the estimates have larger errors in the real1 workload (up to 66%). It should be noted that in FIGS. 6g-i, less than 30% error was obtained in estimating the number of generated plans for the same workload. This discrepancy is caused by a larger variation in the time to generate individual plans in the parallel environment.

The present invention plan estimation is close for both synthetic workloads and more complex random and real customer workloads. The formula that was used to convert the number of plans to time estimates, although simple, is quite effective for most of the workloads tested. It should be emphasized that the results reflect a commercial optimizer in two different environments.

Some of the advantages of the present invention include, but are not limited to: (1) the ability to estimate the compilation time for any general class of query (not limited to certain shapes and connectivity of the graph); (2) the ability to use a wide range of commercial optimizers with or without vendor-specific customization, as long as the enumeration process in the optimizer doesn't depend on plan execution cost estimates; (3) the ability to apply for a wide range of factors that affect the number of plans generated, including, but not limited to, ordering, partitioning, data source, pipelineable, and expensive predicates; (4) the ability to give estimates consistent with the internal configuration of the enumeration process in the optimizer; (5) the ability to support multiple types of join methods (e.g. nested loops, sort-merge, and hash); (6) the ability to provide much more accurate estimates than previous work (25% error on average for the approach vs. orders of magnitude in previous work), and takes only a small amount of time (on average, 2% of real compilation time); (7) the ability to estimate the compilation time for multiple optimization levels in a single pass; or (8) the ability to estimate space consumption in the same pass.

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and any other appropriate static or dynamic memory or data storage devices.

Implemented in computer program code based products are software modules for: (a) aiding in the reception of a query; (b) iterating through possible join pairs for the query; (c) for each join pair, identifying a set of differentiating properties and using the identified set of differentiating properties to calculate the number of join plans; and (d) estimating the compilation time from the calculated number of join plans for each type of join method via a regression model.

CONCLUSION

A system and method has been shown in the above embodiments for the effective estimation of compilation time in a query optimizer. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by type of property, type of regression model, level of optimization, type of enumerator, software/program, or computing environment.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A computer-based method for estimating a query compilation time of a query optimizer, said computer-based method implemented in computer readable program code stored
   in computer memory, said computer-based method comprising the steps of:
   (a) receiving a query;
   (b) iterating through possible join pairs for said query;
   (c) for each join pair, identifying a set of differentiating properties and using said identified set of differentiating properties to calculate number of join plans, said number of join plans are calculated for any join type selected from a group consisting of: nested loops join (NLJN), sort merge join (MGJN), and hash join (HSJN);
   (d) estimating the compilation time from said calculated number of join plans for each type of join method;
   (e) outputting the estimated compilation time; and
   wherein plan generation in said query optimizer is by passed.

2. The computer-based method of claim 1, wherein said join pairs are iterated by reusing existing join enumerator in said query optimizer.

3. The computer-based method of claim 1, wherein said set of differentiating properties comprises any of, or a combination of the following: order, data partition, pipelineability, data source, and presence of expensive predicates.

4. The computer-based method of claim 1, wherein said query is an SQL query.

5. The computer-based method of claim 1, wherein said estimation is performed via a regression model.

6. The computer-based method of claim 1, wherein said differentiating properties are generated in any of the following policies: a lazy policy in which said differentiating properties are generated naturally or an eager policy in which said differentiating properties are forcibly generated via an optimizer.

7. A method as per claim 1, wherein compilation time for multiple optimization levels are estimated in a single pass.

8. A computer-based system for estimating query compilation time via reusing a join enumerator in a query optimizer, said system implemented in computer readable program code stored in computer memory, said system comprising:
(a) an interface to receive a query;
(b) a join enumerator to iterate through possible join pairs for said query, said iteration performed via reusing said join enumerator in said query optimizer;
(c) a property identifier to identify, for each join pair, a set of differentiating properties and use said identified set of differentiating properties to calculate number of join plans; and
(d) a compilation time estimator to estimate and output compilation time from said calculated number of join plans for each type of join method, wherein said number of join plan are calculated for any join type selected from a group consisting of: nested loops join (NLJN), sort merge join (MGJN), and hash join (HSJN), and
wherein the plan generation is said query optimizer is bypassed.

9. The computer-based system of claim 8, wherein said set of differentiating properties comprises any of, or a combination of the following: order, data partition, pipelineability, data source, and presence of expensive predicates.

10. The computer-based system of claim 8, wherein said compilation time estimator uses a regression model to estimate said compilation time.

11. The computer-based system of claim 8, wherein said differentiating properties are generated in any of the following policies: a lazy policy in which said differentiating properties are generated naturally or an eager policy in which said differentiating properties are forcibly generated via a optimizer.

12. The computer-based system of claim 8, wherein said query is an SQL query.

13. An article of manufacture comprising computer usable storage medium having computer readable program code embodied therein estimating a query compilation time of a query optimizer via reusing an existing join enumerator in said query optimizer, said computer storage medium comprising:
(a) computer readable program code aiding in receiving a query;
(b) computer readable program code iterating through possible join pairs for said query;
(c) for each join sequence, computer readable program code identifying a set of differentiating properties and using said identified set of differentiating properties to calculate number of join plans, said number of join plans are calculated for any join type selected from a group consisting of: nested loops join (NLJN), sort merge join (MGJN), and hash join (HSJN);
(d) computer readable program code estimating compilation time from said calculated number of join plans for each type of join method;
(e) computer readable program code outputting the estimated compilation time, and
wherein the plan generation is said query optimizer is bypassed.

14. The article of manufacture of claim 13, wherein said estimation of compilation time is performed via a regression model.

15. The article of manufacture of claim 13, wherein said set of differentiating properties comprises any of, or a combination of the following: order, data partition, pipelineability, data source, and presence of expensive predicates.

16. The article of manufacture of claim 13, wherein said differentiating properties are generated in any of the following policies: a lazy policy in which said differentiating properties are generated naturally or a eager policy in which said differentiating properties are forcibly generated via a optimizer.

17. A method for estimating query compilation time in a query optimizer, said computer-based method implemented in computer readable program code stored in computer memory, said computer-based method comprising the steps of:
bypassing plan generation and reusing a join enumerator of said query optimizer to identify number of joins;
iterating through possible pairs for a query;
for each join, accumulating a set of differentiating properties during enumeration and using said identified set of differentiating properties to calculate number of join plans, said number of join plans are calculated for any join type selected from a group consisting of: nested loops join (NLJN), sort merge join (MGJN), and hash join (HSJN);
estimating compilation time from said calculated number of join plans for each type of join method via a regression model;
outputting said estimated compilation time, and
wherein the plan generation is said query optimizer is bypassed.

18. The computer-based system of claim 17, wherein said set of differentiating properties comprises any of, or a combination of the following: order, data partition, pipelineability, data source, and presence of expensive predicates.

19. The computer-based system of claim 17, wherein said query is an SQL query.

20. The computer-based system of claim 17, wherein said differentiating properties are generated in any of the following policies: a lazy policy in which said differentiating properties are generated naturally or an eager policy in which said differentiating properties are forcibly generated via a optimizer.

* * * * *